United States Patent [19]

Hamamatu et al.

[11] Patent Number: 4,832,771
[45] Date of Patent: May 23, 1989

[54] METHOD FOR BONDING CERAMICS

[75] Inventors: Takashi Hamamatu; Nobuhiro Sato; Haruyuki Ueno, all of Kitakyushu, Japan

[73] Assignee: Kurosaki Refractories Co., Ltd., Fukuoka, Japan

[21] Appl. No.: 174,194

[22] Filed: Mar. 28, 1988

Related U.S. Application Data

[63] Continuation-in-part of Ser. No. 925,703, Oct. 30, 1986, abandoned, which is a continuation-in-part of Ser. No. 701,404, Feb. 14, 1985, abandoned.

[30] Foreign Application Priority Data

Feb. 16, 1984 [JP] Japan .................... 59-28144

[51] Int. Cl.$^4$ ............................................. B32B 18/00
[52] U.S. Cl. ........................................ 156/89; 501/53; 501/54; 501/55
[58] Field of Search .................. 156/89; 501/53, 54, 501/55, 88

[56] References Cited

U.S. PATENT DOCUMENTS

| | | | |
|---|---|---|---|
| 3,966,885 | 6/1976 | May | 156/89 |
| 4,384,909 | 5/1983 | Layden | 156/89 |
| 4,526,649 | 7/1985 | Gupta et al. | 156/89 |
| 4,572,828 | 2/1986 | Sato et al. | 156/89 |

*Primary Examiner*—Caleb Weston
*Attorney, Agent, or Firm*—James J. Ralabate

[57] ABSTRACT

A complex-shaped bonded body of silicon nitride having a high bonding strength of more than 30 kg/mm$^2$ as flexural strength and continuously homogenous microstructure through the bonded portion can be obtained by the method comprising the following five steps:

(a) molding a body from a mixture of silicon powder having a diameter of less than 44 μm and non-oxide ceramics powder having a diameter of less than 44 μm, (b) heating a molded body obtained by step (a) at a temperature of 600 to 1500° C. in a non-oxide atmosphere such as nitrogen or argon gas to sinter said silicon powder and partially convert to silicon nitride retaining 60 to 100 wt. % unreacted silicon powder therein, (c) grinding a surface to be bonded together with other bodies of said presintered body obtained by step (b) to dispose of unreacted silicon thereon, (d) placing a bonding agent containing silicon powder having a diameter of less than 44 μm and polycarboxy silane resin between two bonding surfaces prepared by step (c), pressing together and drying said bonding agent, and (e) sintering the two presintered bodies pressed together in nitrogen atmosphere at a temperature of 1200° to 1500° C. without melting said disposed unreacted silicon.

1 Claim, 1 Drawing Sheet

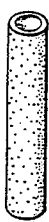
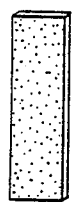
FIG.1a  FIG.1b
FIG.2
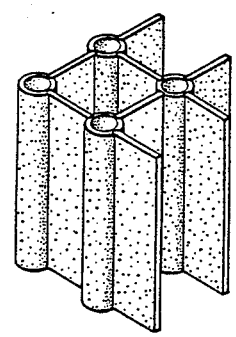

ically produces a good table and may further produce a general-purpose structure.

METHOD FOR BONDING CERAMICS

This application is a Continuation in Part of Ser No. 925,703 filed Oct. 30, 1986, abandoned, which in turn is a Continuation in Part application of parent application Ser. No. 701,404 filed Feb. 14, 1985, abandoned.

BACKGROUND OF THE INVENTION

1. Field of Industrial Applications

This invention relates to a method for producing a bonded body of silicon nitride ceramics having a continuous, homogeneous structure.

2. Prior Art

Heretofore, bonded bodies of silicon nitride ceramics have been produced by fusion-bonding using a glass, metal and the like which is different from ceramics. However, the bonded body having such dissimilar phase in the bonded area suffers low thermal shock resistance and creep characteristics. Thus, the bonded body does not meet a condition of the ceramics, that is, the ceramics has high thermal resistance.

Silicon nitride ceramics bodies can be bonded together by sintering them with silicon nitride ceramics powder interposed between the bonding surfaces thereof. However, sufficient bonding strength cannot be obtained because silicon nitride is difficult to sinter. On the other hand, it is possible to produce a bonded body containing no dissimilar phase and having a high bond strength by using the hot press method which produces a synergistic effect of mechanical pressure and high reaction temperature. Unfortunately, the hot press method is not suitable for bonding objects of complex shape and is not economically advantageous.

Since a dissimilar phase between the bonding surfaces of silicon nitride ceramics makes the bonded body thermally unstable as mentioned above, it is desirable that the bonding interface has the same material as the bonding surface and the bonded body has a continuous, homogeneous structure. In the case of silicon nitride ceramics, there has been no way of producing such a bonded body having high bond strength without resorting to the hot press method.

OBJECT OF THE INVENTION

It is an object of this invention to provide a method for producing a bonded body of silicon nitride ceramics having a high bonding strength and a continuous, homogeneous structure, which has not been obtained by the conventional technology. According to the method of this invention, it is possible to produce bonded bodies of complex shape in a similar manner.

BRIEF EXPLANATION OF THE DRAWING

FIG. 1 is a perspective view showing the presintered bodies to be bonded together.

FIG. 2 is a perspective view showing the bonded bodies prepared from the presintered bodies shown in FIG. 1.

DETAILED DESCRIPTION OF THE INVENTION

Construction of the Invention

This invention discloses a method for bonding ceramics which comprises the first step of preparing a presintered body containing 60 to 100 wt % of unreacted silicon by heating a molding compound composed of silicon powder having a particle diameter smaller than 44 μm and a non-oxide ceramic raw material powder having a particle diameter smaller than 44 μm, at a temperature of 600° to 1500° C.;

the second step of grinding the bonding surface of the presintered body prepared in the first step so that the unreacted silicon is exposed on the bonding surface;

the third step of pressing against each other two bonding surfaces (with the unreacted silicon exposed thereon) of the presintered bodies prepared in the second step, with a bonding agent containing resin and silicon powder having a particle diameter smaller than 44 μm interposed between the bonding surfaces, and drying the bonded presintered bodies; and the fourth step of heating in a nitrogen atmosphere at 1200° to 1500° C. the presintered bodies obtained in the third step so as to sinter together the presintered bodies and the silicon on the bonding surfaces and to nitride the silicon, whereby producing a ceramics bonded body having a continuous structure. In the third step the "bonding agent containing resin" is preferred to be polycarboxy silane since far superior results are obtained when using polycarboxy silane as the resin.

The present invention in its preferred embodiment provides a method for bonding ceramics bodies comprising the steps of:

(a) molding a mixture of silicon powder having a diameter of less than 44 μm and non-oxide ceramics powder consisting of a silicon carbide and/or a silicon nitride having a diameter less than 44 μm to the bodies to be bonded together, (b) presintering the molded bodies in a non-oxidizing atmosphere at a temperature from 1000° C. to 1300° C. to partially sinter or nitride silicon powder in the molded powder mixture. The term non-oxidizing throughout this disclosure refers to an atmosphere of an inert gas such as Ar, He, $N_2$ or $NH_3$. The temperature used is dependent upon the inert gas used, for example, not higher than 1500° C. for Ar and He and below 1300° C. for $N_2$ and $NH_3$. In the preferred embodiment polycarboxy silane is the resin which is a constituent of the bonding agent.

The invention is now described in detail.

According to the method of this invention, at first, presintered bodies in which some silicon is intentionally left unreacted is produced. Two or more of such presintered bodies are heated in a nitriding atmosphere, with a bonding agent composed of silicon powder and a resin. During the heating, heated resin evaporated as a reducing gas including hydrogen as a reaction product, and the oxide film on the surface of silicon particles is removed by reduction. The silicon particles with the oxide film removed start to sinter at 800° C. and a sintered neck which shows a high bonding strength is formed. After forming of the neck, nitriding is brought out. During the heating, silicon particles are not retained as unnitrided state because silicon particles are not molten and also grainsize does not grow up. The strength of the bonded body is attributable to the sintering of unreacted silicon in the presintered body and the silicon particles in the bonding agent. In the case of conventional method where silicon nitride ceramics bodies are bonded together by heating them in a nitriding atmosphere, with silicon powder interposed between the bonding surfaces thereof, the resulting article shows low strength because presence of oxide film on the silicon particles makes sintering difficult.

The sintering of silicon particles is inhibited if there is an oxide film on the silicon particle surface, because it prevents silicon particles from coming into direct contact with one another. According to the method of this invention, the resin in the bonding agent liberates hydrogen when heated to 500° to 1200° C., deoxidizing the oxide film on the surface of silicon particle. Thus, the silicon particles interposed between the bonding surfaces become free of oxide film. In addition, the resin shrinks on heating, causing the silicon particles to come into intimate contact with one another. This promotes silicon-to-silicon bonding by sintering. The sintered silicon then becomes nitrided to form a bonded body having a high bond strength and a continuous homogeneous structure. The more the silicon-to-silicon bond, the higher the bond strength. In other words, as the amount of unreacted silicon increases on the bonding or adherend surface of the presintered body to be bonded, the bond strength becomes higher. If the amount of unreacted silicon is less than 60 wt % in the presintered body to be bonded, the bond strength will be extremely low. Thus, it is necessary that there should be more than 60 wt % of unreacted silicon in the presintered body. Because the bonding strength of the product is revealed by sintering and its nitriding, the kind of non-oxide ceramics materials employed does not affect the strength until 40 wt % in the molded body. Any non-oxide ceramics materials such as silicon carbide, aluminum nitride, boron nitride, and titanium carbide as well as silicon nitride can be employed.

According to this invention, the presintered body is made of silicon powder having a particle diameter smaller than 44 μm. Silicon particles coarser than this diameter may not become nitrided as far as the core of particle. The fineness of silicon powder is also important for silicon powder in the bonding agent. Coarse silicon powder in the bonding agent is undesirable not only because it is poor in nitriding but also because it makes the workability (e.g, viscosity and thixotropic properties) of the bonding agent poor. Thus, silicon powder having a particle diameter smaller than 44 μm should be used for the bonding agent. Polycarboxy silane is the preferred resin to be used in the bonding agent of this invention.

The resin as a constituent of the bonding agent is one which liberates hydrogen and hydrocarbons upon heating at 500 to 1200° C. Examples of the resin include organosilicon polymer, phenolic resin, furan resin, xylene resin, epoxy resin, and unsaturated polyester resin. The resin is dissolved in an organic solvent such as alcohol, hexane, xylene, and THF, and the solution is mixed with silicon powder to make the bonding agent. Polycarboxy silane is by far the preferred resin to be used as the resin constituent of the bonding agent. The meritorious effects of polycarboxy silane compared with typical binders such as phenol resin previously used in this technical field are as follows:

(1) Comparison at room temperature: Binding strength of polycarboxy silane is twice as strong as phenol resin which makes molded body much easier to bring and treat without breaking.

(2) Comparison in sintering process: In case of complete sintering, remarkable difference cannot be recognized because binding strength of each particle consisting of molded body is brought out by Si particles themselves, as shown in Table 3. However, in case of heating process for presintering, phenol resin employed is completed of decomposition at about 400° C. and bonding strength is developed only by carbon bond. Comparing with this phenomenon in case of phenol resin, polycarboxy silane employed having decomposition temperature of about 800° C. is possible to keep strength of molded body in same level as that of room temperature. In temperature range higher than 800° C., binding strength of Si particles and the sintering strength of reaction sintering of SiC are developed. The binding strength when polycarboxy silane is used can be developed to a rate of twice compared with case of using phenol resin.

As described above, the advantage of using polycarboxy silane as a binder is remarkable when compared with other typical resin binders.

The presintered body to be bonded which contains unreacted silicon is easier to cut and machine with high precision than the sintered body of silicon nitride. An article produced by bonding accurately machined presintered bodies undergoes very little dimensional change in the subsequent heat treatment for nitriding, because it has undergone dimensional change during heat treatment for presintering. The only dimensional change that takes place in the subsequent step is that of the bonding interface. It is less than 80 μm because the maximum shrinkage is 8% in the bond interface which is 1000 μm in thickness at greatest. Thus, the method of this invention provides bonded bodies having a very high dimensional accuracy, and makes it easy to bond to produce bonded body of a complex shape.

EXAMPLES AND EFFECTS

The invention is now described with reference to the following examples.

EXAMPLE 1

Molded bodies were prepared from starting materials of various composition, wherein silicon powder having a particle diameter smaller than 44 μm, silicon nitride powder having a particle diameter smaller than 44 μm, and phenolic resin are varied as shown in Table 1. The molded bodies were then presintered by heating at 1100° C. for 15 hours in argon.

The presintered body was cut into square test pieces each measuring 40×40×10 mm. The bonding surface of the test piece was ground by using a grinding machine, followed by washing and drying. To the bonding surface was applied a bonding agent composed of 93 wt % of silicon powder having a particle diameter smaller than 44 μm and 7 wt % of resin dissolved in ethyl alcohol. Two test pieces were joined together, followed by drying at 250° C. for 5 hours. The jointed test pieces were finally heated at 1400° C. for 10 hours in nitrogen. Thus there was obtained a bonded body measuring 80×40×10 mm.

On microscopic examination of all the sintered bodies of four compositions, no boundary was observed between the parent material and the bond interface and the bonded body was found to have a continuous structure.

For measuring flexural strength, a test piece measuring 50×3×3 mm was cut out of the bonded body in such a way that the bond interface is almost at the center of the piece. The test piece underwent flexural test at normal temperature using an Instron tester. The results are shown in Table 2.

TABLE 1

| | Composition wt % | | | |
|---|---|---|---|---|
| | A | B | C | D |
| Silicon | 70 | 77 | 87 | 93 |
| Silicon nitride | 23 | 16 | 6 | 0 |
| Phenolic resin | 7 | 7 | 7 | 7 |

TABLE 2

| | A | B | C | D |
|---|---|---|---|---|
| Flexural strength (kg/mm$^2$) | 30.5 | 32.5 | 33.5 | 34.0 |

COMPARATIVE EXAMPLE 1

Presintered bodies of composition D were bonded together in the same manner as in Example 1 except that the resin in the bonding agent was replaced by organosilicon polymer, phenolic resin, polyvinyl butyral, or sodium aldarate. The resulting bonded bodies were examined for flexural strength. The results are shown in Table 3. The strength of the bonded bodies using polyvinyl butyral and sodium alginate are extremely low.

TABLE 3

| Resin in bonding agent | Flexural strength (kg/mm$^2$) |
|---|---|
| Organosilicon polymer | 34.5 |
| Phenolic resin | 34.0 |
| Polyvinyl butyral | 11.0 |
| Sodium alginate | 9.5 |
| Ammonium alginate | 9.4 |

EXAMPLE 2

Hollow cylindrical presintered bodies as shown in FIG. 1(a) and flat square presintered bodies as shown in FIG. 1(b) were prepared from the composition D shown in Table 1 in Example 1. They were bonded together in the same way as in Example 1, followed by heating in a nitriding atmosphere, to produce a bonded body as shown in FIG. 2.

The dimensions of the bonded body were almost same as those measured when the presintered bodies were joined together. The dimensional change in the direction of bonding was less than ±0.15 mm.

EXAMPLE 3

Bonded bodies were prepared in the same manner as in Example 1 except that silicon nitride was replaced by silicon carbide. The composition is shown in Table 4. The resulting bonded bodies were found to have a continuous structure and have almost the same flexural strength as in Example 1. The flexural strength is shown in Table 5.

TABLE 4

| Composition (wt %) | a | b | c | d |
|---|---|---|---|---|
| Silicon | 70 | 77 | 87 | 93 |
| Silicon carbide | 23 | 16 | 6 | 0 |
| Phenolic resin | 7 | 7 | 7 | 7 |

TABLE 5

| | a | b | c | d |
|---|---|---|---|---|
| Flexural strength (kg/mm$^2$) | 31.0 | 32.5 | 33.0 | 34.5 |

EXAMPLE 4

Bonded bodies were prepared in the same way as in Example 1 except that the bonding agent was replaced by the one composed of 95 wt % of silicon powder having a particle diameter smaller than 44 μm and 5 wt % of organosilicon polymer dissolved in hexane. The resulting bonded bodies were found to have a continuous homogeneous structure and have almost the same flexural strength as in Example 1.

What is claimed is:

1. A method for producing a bonded body having a high bonding strength comprising steps of:
   (a) molding a body from a mixture of silicon powder having a diameter of less than 44 μm and non-oxide ceramics powder having a diameter of less than 44 μm,
   (b) heating a molded body obtained by step (a) at a temperature of 600° to 1500° C. in a non-oxide atmosphere such as nitrogen or argon gas to sinter said silicon powder and partially convert to silicon nitride retaining 60 to 100 wt. % unreacted silicon powder therein,
   (c) grinding a surface to be bonded together with other bodies of said presintered body obtained by step (b) to dispose of unreacted silicon thereon,
   (d) placing a bonding agent containing silicon powder having a diameter of less than 44 μm and polycarboxy silane resin between two bonding surfaces prepared by step (c), pressing together and drying said bonding agent, and
   (e) sintering the two presintered bodies pressed together in nitrogen atmosphere at a temperature of 1200° to 1500° C. without melting said disposed unreacted silicon.

* * * * *